United States Patent
Li et al.

(10) Patent No.: US 9,444,709 B2
(45) Date of Patent: Sep. 13, 2016

(54) BIDIRECTIONAL FORWARDING DETECTION BFD SESSION NEGOTIATION METHOD, DEVICE, AND SYSTEM

(71) Applicant: Huawei Technologies Co., Ltd., Shenzhen, Guangdong (CN)

(72) Inventors: Jingtang Li, Shenzhen (CN); Yu Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 14/314,441

(22) Filed: Jun. 25, 2014

(65) Prior Publication Data

US 2014/0307564 A1    Oct. 16, 2014

Related U.S. Application Data

(63) Continuation of application No. PCT/CN2012/084513, filed on Nov. 13, 2012.

(51) Int. Cl.
*H04L 12/26* (2006.01)
*H04L 29/08* (2006.01)
*H04L 29/14* (2006.01)
*H04L 29/06* (2006.01)

(52) U.S. Cl.
CPC ....... *H04L 43/0823* (2013.01); *H04L 63/1441* (2013.01); *H04L 63/162* (2013.01); *H04L 67/141* (2013.01); *H04L 67/146* (2013.01); *H04L 69/24* (2013.01); *H04L 69/40* (2013.01); *H04L 43/0811* (2013.01); *H04L 63/08* (2013.01); *H04L 67/327* (2013.01)

(58) Field of Classification Search
None
See application file for complete search history.

(56) References Cited

U.S. PATENT DOCUMENTS

| 7,561,527 B1 * | 7/2009 | Katz ................... H04L 12/2697 370/241 |
| 9,094,344 B2 * | 7/2015 | Boutros ................ H04L 49/351 |
| 2007/0189177 A1 * | 8/2007 | Zhai ........................ H04L 45/10 370/244 |
| 2007/0207591 A1 * | 9/2007 | Rahman ................. H04L 45/00 438/439 |
| 2008/0247324 A1 | 10/2008 | Nadeau et al. |
| 2009/0010153 A1 | 1/2009 | Filsfils et al. |
| 2009/0046723 A1 * | 2/2009 | Rahman .............. H04L 41/0695 370/395.31 |
| 2010/0049868 A1 * | 2/2010 | Ginsberg ................ H04L 45/28 709/242 |

(Continued)

FOREIGN PATENT DOCUMENTS

| CN | 1905516 A | 1/2007 |
| CN | 101030966 A | 9/2007 |

(Continued)

OTHER PUBLICATIONS

D. Katz, et al., "Bidirectional Forwarding Detection (BFD)", Internet Engineering Task Force (IETF), Jun. 2010, 49 pages.

(Continued)

*Primary Examiner* — Hong Cho

(57) ABSTRACT

The present invention relates to a BFD session negotiation method. The BFD session negotiation method includes: generating a first discriminator value, where the first discriminator value is unique in a local area network to which a local device belongs; generating a first BFD control packet, where the first BFD control packet includes the first discriminator value; and sending the first BFD control packet to a peer device, so that the peer device performs a session negotiation with the local device according to the first discriminator value.

11 Claims, 2 Drawing Sheets

(56) References Cited

U.S. PATENT DOCUMENTS

| | | | |
|---|---|---|---|
| 2010/0149992 A1* | 6/2010 | Tan | H04L 45/28 370/242 |
| 2010/0246577 A1* | 9/2010 | Wu | H04L 41/0677 370/389 |
| 2011/0202670 A1* | 8/2011 | Zheng | H04L 47/2483 709/228 |
| 2011/0238843 A1* | 9/2011 | Pan | H04L 45/22 709/227 |
| 2011/0286324 A1 | 11/2011 | Bellagamba et al. | |
| 2014/0019614 A1* | 1/2014 | Rahman | H04L 45/00 709/224 |

FOREIGN PATENT DOCUMENTS

| | | |
|---|---|---|
| CN | 101052045 A | 10/2007 |
| CN | 102075390 A | 5/2011 |
| CN | 102457404 A | 5/2012 |
| CN | 102571601 A | 7/2012 |
| EP | 2 383 934 A1 | 11/2011 |
| JP | 2010220037 A | 9/2010 |

OTHER PUBLICATIONS

D. Katz, et al., "Bidirectional Forwarding Detection (BFD) for IPv4 and IPv6 (Single Hop)", Internet Engineering Task Force (IETF), Jun. 2010, 7 pages.

D. Katz, et al., "Bidirectional Forwarding Detection (BFD) for Multihop Paths", Internet Engineering Task Force (IETF), Jun. 2010, 6 pages.

R. Aggarwal, et al., "Bidirectional Forwarding Detection (BFD) for MPLS Label Switched Paths (LSPs)", Internet Engineering Task Force (IETF), Jun. 2010, 12 pages.

\* cited by examiner

BIDIRECTIONAL FORWARDING DETECTION BFD SESSION NEGOTIATION METHOD, DEVICE, AND SYSTEM

CROSS-REFERENCE TO RELATED APPLICATIONS

This application is a continuation of International Application No. PCT/CN2012/084513, filed on Nov. 13, 2012, which is hereby incorporated by reference in its entirety.

TECHNICAL FIELD

The present invention relates to the communications technologies, and in particular, to a bidirectional forwarding detection (BFD) session negotiation method, device, and system.

BACKGROUND

Bidirectional forwarding detection (Bidirectional Forwarding Detection, BFD) operates under unicast and P2P modes and is used to perform rapid fault detection on any type of channel between network devices.

If multiple channels exist between a pair of network devices, that is, multiple channels exist in at least one direction, multiple BFD sessions need to be correspondingly established between the pair of network devices.

In order to make a received BFD control packet correspond to a corresponding BFD session, each network device needs to select an opaque discriminator value for each BFD session, and discriminator values of all BFD sessions in each network device are unique.

A local discriminator value of each network device is sent through a "My Discriminator (MD for short below)" field of a BFD control packet, and is returned through a "Your Discriminator (YD for short below)" field of a response packet of a remote network device. Once the remote network device returns the local discriminator value, subsequently received BFD control packets are all separated only according to the local discriminator value, that is, different BFD sessions are distinguished by using the discriminator value. Therefore, it can be said that an MD and a YD are the only basis for identifying a pair of BFD sessions. When a session negotiation is UP, receiving and sending of a packet and modification to a session parameter perform matching only according to the MD and the YD.

However, in a same local area network, the probability of same MDs occurring in BFD sessions is extremely large, and MDs generated by BFD sessions may conflict, which results in that the BFD sessions are unable to be negotiated normally.

In the prior art, an authentication option in a BFD control packet is set to ensure correct negotiation between BFD sessions. This, however, requires all network devices to support an authentication function of BFD, implementation is complex, and a user needs to further configure authentication in addition to basic configuration of BFD.

SUMMARY

Embodiments of the present invention provide a bidirectional forwarding detection BFD session negotiation method, device, and system, so as to solve the problem of a BFD session negotiation error.

In a first aspect, an embodiment of the present invention provides a bidirectional forwarding detection BFD session negotiation method, which includes:

generating a first discriminator value, where the first discriminator value is unique in a local area network to which a local device belongs;

generating a first BFD control packet, where the first BFD control packet includes the first discriminator value; and sending the first BFD control packet to a peer device, so that the peer device performs a session negotiation with the local device according to the first discriminator value.

In another aspect, an embodiment of the present invention provides a bidirectional forwarding detection BFD session negotiation device, which includes:

a discriminator value generating unit, configured to generate a first discriminator value, where the first discriminator value is unique in a local area network to which a local device belongs;

a packet generating unit, configured to generate a first BFD control packet, where the first BFD control packet includes the first discriminator value; and a packet sending unit, configured to send the first BFD control packet to a peer device, so that the peer device performs a session negotiation with the local device according to the first discriminator value.

In another aspect, an embodiment of the present invention provides a bidirectional forwarding detection BFD session negotiation system, which includes a local device and a peer device, where:

the local device is configured to generate a first discriminator value, where the first discriminator value is unique in a local area network to which the local device belongs; generate a first BFD control packet, where the first BFD control packet includes the first discriminator value; and send the first BFD control packet to the peer device; and the peer device is configured to perform a session negotiation with the local device according to the first discriminator value.

In the bidirectional forwarding detection BFD session negotiation method, device, and system provided by the embodiments of the present invention, a local discriminator value is set as a unique value in a local area network to which a local device belongs, so as to eliminate the possibility that different BFD sessions in the local area network generate a same MD. This eliminates a session negotiation error incurred by an error configuration or miscellaneous packet deception, thereby improving efficiency and security of a BFD session negotiation.

DETAILED DESCRIPTION

Figure 1:
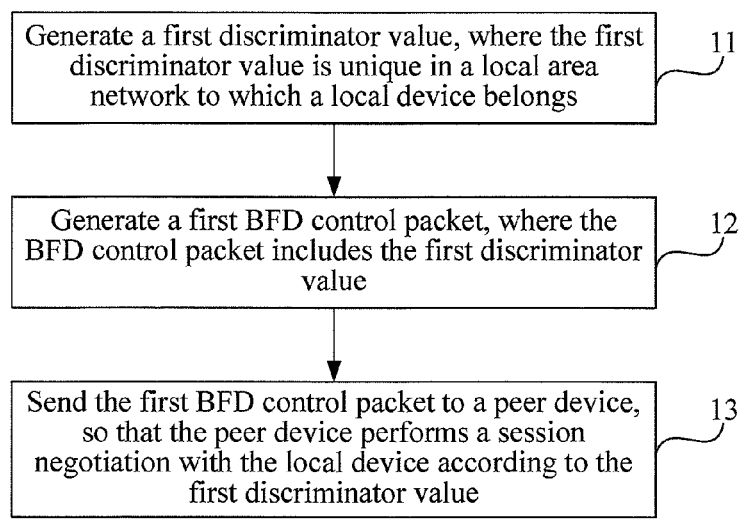
FIG. 1 is a flow chart of a bidirectional forwarding detection BFD session negotiation method according to an embodiment of the present invention.

FIG. 1 is a flow chart of a bidirectional forwarding detection BFD session negotiation method according to an embodiment of the present invention. The method provided by this embodiment is a processing procedure of a device for a BFD session negotiation, and the device for the BFD session negotiation is a network device. As shown in FIG. 1, the method includes the following steps:

Step 11: Generate a first discriminator value, where the first discriminator value is unique in a local area network to which a local device belongs.

In this step, the generating the first discriminator value may be that the first discriminator value is generated according to identification information of the local device. The first discriminator value may be a local discriminator value. The identification information of the local device includes one or more of a media access control (Media Access Control, MAC) address, a device name, an interface IP, and an outbound interface index of the local device. The generating the first discriminator value may include: combining a result, which is obtained by mapping, according to a set mapping algorithm, the identification information of the local device, and a serial number of a session corresponding to a first BFD control packet to form the first discriminator value. For details of the first BFD control packet, refer to illustration in step 12 below. The set mapping algorithm may include a hash algorithm, and the result obtained by mapping may include a hash index.

For example, the local device maps the identification information of the device, for example, one or more of a system bridge MAC address, the device name, the interface IP, the interface IP and the outbound interface index, to the first two bytes of an MD field in a BFD control packet through the hash algorithm. The last two bytes of the MD field are allocated to a serial number of a BFD session. Because content of the MD field is the local discriminator value, the first two bytes of the local discriminator value are the identification information of the local device, and the last two bytes are the serial number of the BFD session.

Because an identifier of the network device is unique, and a maximum value of two bytes is 65535, the local discriminator value is unique in the entire network, thereby substantially eliminating the possibility that different BFD sessions generate a same MD.

Step 12: Generate the first BFD control packet, where the BFD control packet includes the first discriminator value.

For example: "BFD Control message
001=Protocol Version: 1
00011=Diagnostic Code:Neighbor Signaled Session Down (0X03)
01=Session State:Down (0X01)
Message Flags:0X00
Detect Time Multiplier:3 (=6300 ms Detection time)
Message Length:24 bytes
My Discriminator:0X01000007
Your Discriminator:0X00000000
Desired Min TX Interval:2100 ms(2100000 us)
Required Min RX Interval:2100 ms(2100000 us)
Required Min Echo Interval:0 ms(0 us)".

The first two bytes 0100 of "My Discriminator: 0X01000007", that is, the MD, are obtained according to the identification information of the local device through the mapping algorithm, and the last two bytes 0007 are the serial number of the session.

Step 13: Send the first BFD control packet to a peer device, so that the peer device performs a session negotiation with the local device according to the first discriminator value.

Optionally, after the sending the first BFD control packet to a peer device, the method further includes:

receiving a second BFD control packet sent by the peer device, where the second BFD control packet sent by the peer device carries a second discriminator value generated by the peer device; and using the first discriminator value and the second discriminator value to identify a session.

Optionally, the second discriminator value of the peer device is unique in a local area network to which the peer device belongs. For generation of the second discriminator value, refer to the generation of the first discriminator value in step 11.

The local device and the peer device may both be network devices such as routers and switches.

The technical solution provided by this embodiment can avoid a session negotiation error incurred by an error configuration or miscellaneous packet deception in a BFD session scenario. The miscellaneous packet deception refers to BFD control packets that are sent by a malicious attack in a network and have a same MD. A device without an authentication function may avoid a BFD session negotiation error incurred by MDs being the same, thereby decreasing costs.

Figure 2:
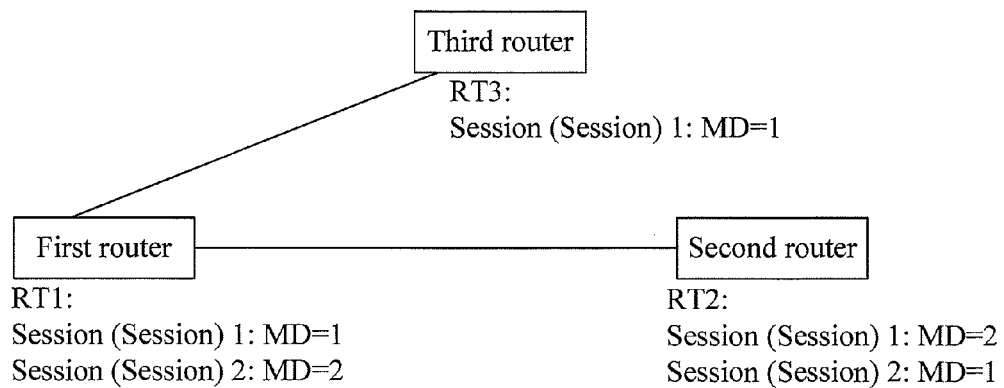
FIG. 2 is a schematic diagram of an application environment of a bidirectional forwarding detection BFD session negotiation method according to an embodiment of the present invention.

For example, as shown in FIG. 2, a first router RT1 is connected to a second router RT2 and a third router RT3.

Two BFD sessions Session1 and Session2 are established between the first router RT1 and the second router RT2. It is assumed that physical information configurations of Session1 of the first router RT1 correspond to physical information configurations of Session1 of the second router RT2 in a one-to-one manner, physical information configurations of Session2 of the first router RT1 correspond to physical information configurations of Session2 of the second router RT2 in a one-to-one manner, and respective MDs are generated according to a commonly used method, as shown in FIG. 2, so that in a normal case, Session1 of the first router RT1 and the second router RT2 may be negotiated into a pair of normal BFD sessions, and Session2 is negotiated into another pair of normal BFD sessions.

However, in an initial phase of negotiation, when the BFD sessions Session1 and Session2 on the first router RT1 are still in Down state, the first router RT1 receives a BFD control packet for negotiating a BFD session from the third router RT3, an MD carried by the negotiation packet is 1, and due to an error configuration or a network deception attack, physical information in the BFD control packet for negotiating the BFD session matches the session Session1 of the first router RT1, and the first router RT1 learns that a YD of Session1 is 1.

Because a route of the first router RT1 is to the second router RT2, a BFD control packet, with a state of Session1 being "Init", of the first router RT1 is sent to the second router RT2, and a YD carried by the BFD control packet with the state being "Init" is 1. The second router RT2 receives the packet, and matches the YD in the BFD control packet with the state being "Init" to an MD set by a local device, that is, the second router RT2, for the BFD session.

Session2 is matched, that is, the BFD control packet with the state being "Init" is separated to the session Session2. Therefore, Session2 of the second router RT2 is mistakenly negotiated with Session1 of the first router RT1 between the second router RT2 and the first router RT1, and a state of Session2 of the second router RT2 changes into UP.

When a BFD control packet with a state of Session2 being "Down" sent by the first router RT1 reaches the second router RT2, a YD field in the BFD control packet with the state being "Down" is 0, and according to physical configuration information of the first router RT1 and the second router RT2, the BFD session negotiated by the second router RT2 and the first router RT1 shall be Session2 of the second router RT2 (refer to 6.8.6 in the protocol RFC5880 recording "If the Your Discriminator field is zero and the State field is not Down or AdminDown, the packet MUST be discarded."). However, at this time, the state of Session2 of the second router RT2 is already the "UP" state, and therefore the second router RT2 discards the BFD control packet with the state being "Down". Similarly, a negotiation packet of Session1 sent by the second router RT2 is also discarded by the first router RT1. Eventually, it results in that the first router RT1 cannot successfully negotiate with the second router RT2 for Session2 of the first router RT1, and the second router RT2 cannot successfully negotiate with the first router RT1 for Session1 of the second router RT2.

When the technical solution provided by the embodiment of the present invention is adopted, after the first router RT1 sends the YD of Session1, which is learned from the negotiation packet sent by the third router RT3, to the second router RT2 through the BFD control packet with the state being "Init", the YD received by the second router RT2 cannot match the locally set MD, and the second router RT2 discards the received BFD control packet carrying the YD and with the state being "Init", so as to prevent an error negotiation from occurring between the first router RT1 and the second router RT2. The reason is that, according to the technical solution provided by the embodiment of the present invention, an MD in the negotiation packet sent by the third router RT3 is unique in the entire network, an MD set by the second router RT2 is also unique in the entire network, and the MDs of the two cannot be consistent. In this way, it is ensured that, in a situation of third party network deception or error configuration, the two end devices can still negotiate with each other normally, and the two end devices are not required to have an authentication function, making implementation easy.

Embodiment 1

Figure 3:
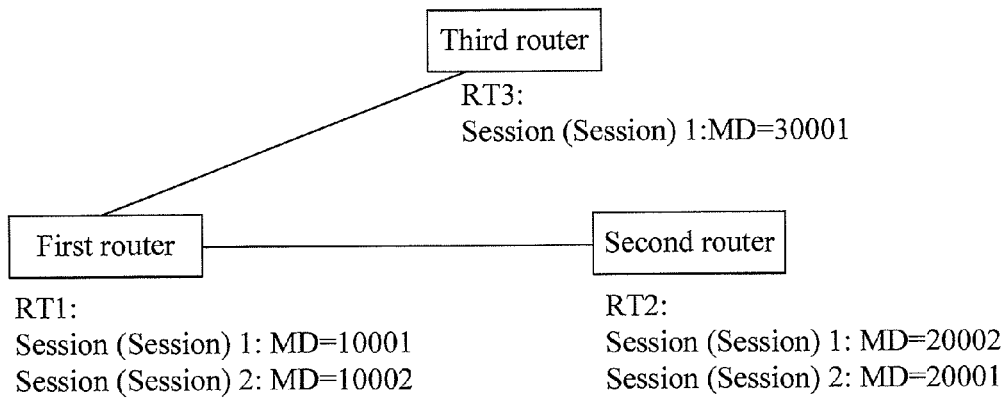
FIG. 3 is a schematic application diagram of a bidirectional forwarding detection BFD session negotiation method according to an embodiment of the present invention.

The first router RT1, the second router RT2, and the third router RT3 are still used as an example. As shown in FIG. 3, each router maps a system bridge MAC address of the device to the first two bytes of four bytes of an MD field through a HASH algorithm, so that the MD is unique at least in a local area network. The last two bytes of the MD field are allocated to a serial number of a BFD session, so as to distinguish different sessions on a same device.

Because the system bridge MAC address is unique, MDs of sessions generated by the first router RT1, the second router RT2, and the third router RT3 are all unique, and do not conflict.

In this way, after the first router RT1 receives a negotiation packet sent by the third router RT3 (network misconfiguration or a malicious attack exists, and physical information carried by the negotiation packet matches Session1 of the first router RT1), and a learned YD of Session1 is 30001, where "3" is a value calculated through the hash algorithm, and "0001" is a serial number of a BFD session. A state of Session1 of the first router RT1 changes into the "Init" state.

The first router RT1 sends a BFD control packet with the state of Session1 being "Init" to the second router RT2. Because a YD carried by the BFD control packet with the state being "Init" is not consistent with any MD of all Sessions set by the second router RT2, the second router RT2 discards the BFD control packet with the state being "Init". When all BFD control packets, for establishing a BFD session Session2, from the first router RT1 are normally sent to the second router RT2, the second router RT2 is capable of correctly negotiating Session2 into the "UP" state with the first router RT1.

When attack from the third router RT3 stops, and after the first router RT1 receives no BFD control packet for negotiating the BFD session, the state of Session1 of the first router RT1 switches back to the "Down" state. Because the second router RT2 keeps sending a BFD control packet with the state of Session1 being "Down" to the first router RT1, the two negotiate correctly again, and return to normal.

Under the networking, if a BFD control packet, with the state being "Down", from the second router RT2 reaches the first router RT1 first, the first router RT1 and the second router RT2 negotiate correctly, and when the states of Session1 of the first router RT1 and the second router RT2 are UP, generally, upon receiving a BFD control packet, with the state being "Down", from the third router RT3, the first router RT1 may still make Session1 of the first router RT1 change into Down. However, after the technical solution provided by the embodiment shown in FIG. 1 is adopted, even if the first router RT1 receives an error BFD control packet, that is, the BFD control packet with the state being "Down", from the third router RT3, because a YD in the error BFD control packet does not match an MD set by the first router RT1, the error BFD control packet is directly discarded by the first router RT1. Therefore, the error BFD control packet of the third router RT3 does not affect the BFD session negotiation between the first router RT1 and the second router RT2.

Embodiment 2

Figure 4:
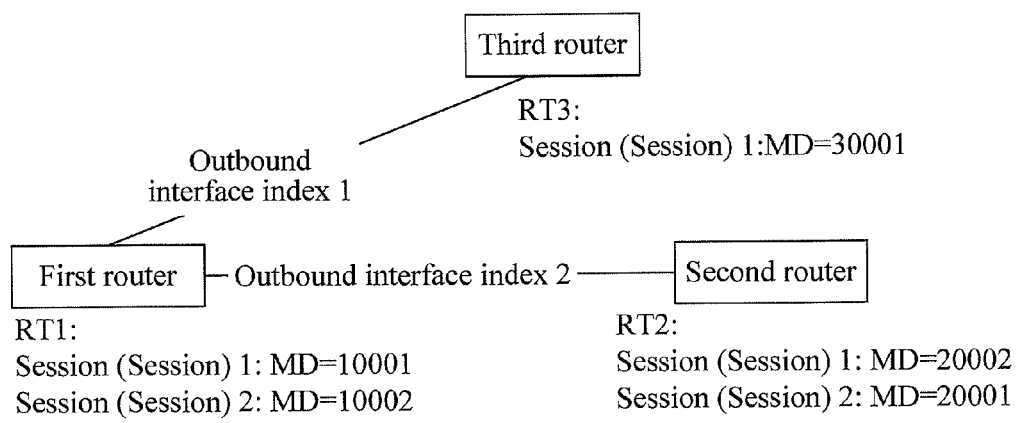
FIG. 4 is another schematic application diagram of a bidirectional forwarding detection BFD session negotiation method according to an embodiment of the present invention.

The first router RT1, the second router RT2, and the third router RT3 are still used as an example. As shown in FIG. 4, each router maps a source IP address of an outbound interface of a BFD control packet of the device plus an outbound interface index to the first two bytes of four bytes of an MD field through a HASH algorithm. The last two bytes of the MD field are allocated to a serial number of a BFD session. That is to say, identification information of the device is the source IP address of the outbound interface of the BFD control packet plus the outbound interface index; in other words, the first two bytes in the MD are obtained by mapping the identification information of the local device, that is, the source IP address of the outbound interface of the BFD control packet plus the outbound interface index, which makes the MD unique in a local area network. The last two bytes of the MD are the serial number of the BFD session and capable of distinguishing different sessions on a same device.

Because in a network, an IP address is unique, the IP address may also be used as identification information of the device. However, in a situation of misconfiguration or malicious attack, IP addresses may conflict, and therefore the source IP address of the outbound interface of the BFD control packet of the device plus the packet outbound interface index may be used for hash calculation to obtain a hash index, which is used as the first two bytes of the MD field.

As shown in FIG. 4, an outbound interface corresponding to an outbound interface index 1 of the first router RT1 sends a BFD control packet to the third router RT3, and an outbound interface corresponding to an outbound interface index 2 of the first router RT1 sends a BFD control packet to the second router RT2. After the first router RT1 successfully negotiates, through the outbound interface corresponding to the outbound interface index 2, with the second router RT2 for a BFD session Session1 first, for Session1 of the first router RT1 in a situation of malicious attack or misconfiguration, even if the first router RT1 receives a BFD control packet sent by the third router RT3, because an outbound interface index in the BFD control packet sent by the third router RT3 is not consistent with a normal outbound interface index of the second router RT2, MDs generated by the third router RT3 and the second router RT2 are different, and the BFD control packet from the third router RT3 is discard normally by the first router RT1, incurring no situation of mismatch.

For other operation scenarios, the technical effect achieved by adopting the technical solution provided by this embodiment is the same as that in Embodiment 1.

Embodiment 3

In this embodiment, identification information of a local device is a device name of the local device. The device name is generally described with a string. The string of the device name is converted into corresponding hexadecimal digits, and the group of digits is used to generate a HASH index, with which the first two bytes of four bytes of an MD field are filled. The last two bytes of the MD field are allocated to a serial number of a BFD session.

For a normally used device in a network, an operator generally changes the device name of the device so that the device name of the network device is unique within a specified scope. Therefore, the first two bytes in the MD are mapped by using the device name so that the MD is unique in a local area network, and the last two bytes of the MD are allocated to a serial number of a BFD session, so as to distinguish different sessions on a same device.

For other operation scenarios, the technical effect achieved by adopting the technical solution provided by this embodiment is the same as that in Embodiment 1.

In the bidirectional forwarding detection BFD session negotiation method provided by the method embodiments, a local discriminator value is set as a unique value in a local area network to which a local device belongs, so as to eliminate the possibility that different BFD sessions in the local area network generate a same MD. This eliminates a session negotiation error incurred by an error configuration or miscellaneous packet deception, thereby improving efficiency and security of a BFD session negotiation.

It can be understood by persons of ordinary skill in the art that all of or a part of the steps in the method according to the embodiments may be implemented by a program instructing relevant hardware. The program may be stored in a computer readable storage medium. When the program is run, the steps of the method according to the embodiments are performed. The storage medium may be any medium that is capable of storing program codes, such as a ROM, a RAM, a magnetic disk, and an optical disk.

Figure 5:
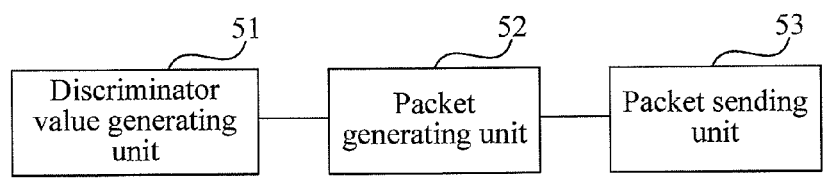
FIG. 5 is a schematic structural diagram of a bidirectional forwarding detection BFD session negotiation device according to an embodiment of the present invention.

FIG. 5 is a schematic structural diagram of a bidirectional forwarding detection BFD session negotiation device according to an embodiment of the present invention. The device provided by this embodiment is configured to implement the method provided by the embodiment shown in FIG. 1. As shown in FIG. 5, the device includes: a discriminator value generating unit 51, a packet generating unit 52, and a packet sending unit 53.

The discriminator value generating unit 51 is configured to generate a first discriminator value, where the first discriminator value is unique in a local area network to which a local device belongs. The packet generating unit 52 is configured to generate a first BFD control packet, where the first BFD control packet includes the first discriminator value generated by the discriminator value generating unit 51. The packet sending unit 53 is configured to send the first BFD control packet generated by the packet generating unit 52 to a peer device, so that the peer device performs a session negotiation with the local device according to the first discriminator value.

Optionally, the BFD session negotiation device provided by this embodiment of the present invention further includes a packet receiving unit and a session negotiation unit. The packet receiving unit is configured to receive a second BFD control packet from the peer device, where the second BFD control packet carries a second discriminator value generated by the peer device. The session negotiation unit is configured to use the first discriminator value and the second discriminator value to identify a session.

In the bidirectional forwarding detection BFD session negotiation device provided by the device embodiment, the discriminator value generating unit sets a local discriminator value as a unique value in a local area network to which a local device belongs, so as to eliminate the possibility that different BFD sessions in the local area network generate a same MD. This eliminates a session negotiation error incurred by an error configuration or miscellaneous packet deception, thereby improving efficiency and security of a BFD session negotiation.

The bidirectional forwarding detection BFD session negotiation device provided by the embodiment of the present invention includes a processor, for example a CPU, and the processor is configured to execute the following operations:

generate a first discriminator value, where the first discriminator value, details of which are in the illustration of the method embodiment, is unique in a local area network to which a local device belongs;

generate a first BFD control packet, where the first BFD control packet includes the generated first discriminator value; and send the first BFD control packet to a peer device, so that the peer device performs a session negotiation with the local device according to the first discriminator value.

Optionally, the processor further executes the following operations:

receive a second BFD control packet from the peer device, where the second BFD control packet carries a second discriminator value generated by the peer device; and use the first discriminator value and the second discriminator value to identify a session.

Optionally, the processor is further configured to generate the first discriminator value according to identification information of the local device.

Optionally, the processor is further configured to combine a result, which is obtained by mapping, according to a set mapping algorithm, the identification information of the local device, and a serial number of a session corresponding to the first BFD control packet to form the first discriminator value.

In the bidirectional forwarding detection BFD session negotiation device provided by the device embodiment, the processor sets a local discriminator value as a unique value in a local area network to which a local device belongs, so as to eliminate the possibility that different BFD sessions in the local area network generate a same MD. This eliminates a session negotiation error incurred by an error configuration or miscellaneous packet deception, thereby improving efficiency and security of a BFD session negotiation.

Figure 6:
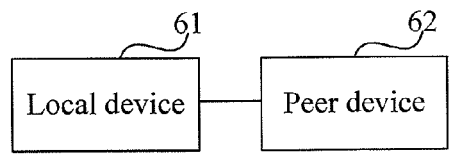
FIG. 6 is a schematic diagram of a bidirectional forwarding detection BFD session negotiation system according to an embodiment of the present invention.

FIG. 6 is a schematic diagram of a bidirectional forwarding detection BFD session negotiation system according to an embodiment of the present invention. The BFD session negotiation system provided by this embodiment of the present invention is configured to implement the method shown in FIG. 1, and as shown in FIG. 6, the BFD session negotiation system includes a local device 61 and a peer device 62.

The local device 61 is configured to generate a first discriminator value, where the first discriminator value is unique in a local area network to which the local device 61 belongs, and for details, refer to the illustration in the method embodiment. The local device 61 is further configured to generate a first BFD control packet, where the first BFD control packet includes the first discriminator value. The local device 61 is further configured to send the first BFD control packet to the peer device 62.

The peer device 62 is configured to perform a session negotiation with the local device 61 according to the first discriminator value.

Optionally, the peer device 62 is specifically configured to send a second BFD control packet to the local device 61, where the second BFD control packet carries a second discriminator value generated by the peer device, and the second discriminator value is unique in a local area network to which the peer device 62 belongs. For details of the second discriminator value, refer to the illustration in the method embodiment.

Optionally, the local device 61 is further configured to receive the second BFD control packet, and use the first discriminator value and the second discriminator value to identify a session.

In the system embodiment, the local device sets a first discriminator value, for example a local discriminator value, as a unique value in a local area network to which the local device belongs, so as to eliminate the possibility that different BFD sessions in the local area network generate a same MD. This eliminates a session negotiation error incurred by an error configuration or miscellaneous packet deception, thereby improving efficiency and security of a BFD session negotiation.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, without departing from the scope of the technical solutions of the embodiments of the present invention.

What is claimed is:

1. A bidirectional forwarding detection (BFD) session negotiation method, comprising:
    performing a mapping operation on identification information of a local device according to a mapping algorithm to obtain a mapping result;
    combining the mapping result and a serial number of a session corresponding to a first BFD control packet to form a first discriminator value, wherein the first discriminator value is unique in a local area network to which the local device belongs;
    generating the first BFD control packet, wherein the first BFD control packet comprises the first discriminator value; and
    sending the first BFD control packet including the first discriminator to a peer device that performs a session negotiation with the local device according to the first discriminator value.

2. The method according to claim 1, wherein after sending the first BFD control packet to the peer device, the method further comprises:
    receiving a second BFD control packet from the peer device, wherein the second BFD control packet carries a second discriminator value generated by the peer device; and
    using the first discriminator value and the second discriminator value to identify a session.

3. The method according to claim 1, wherein the identification information of the local device comprises one or more of a media access control (MAC) address, a device name, an interface IP, and an outbound interface index of the local device.

4. The method according to claim 3, wherein when the identification information of the local device is the device name of the local device, describing the device name with a string, converting the string of the device name into corresponding hexadecimal digits, generating a hash index in accordance with the digits, filling a first two bytes of four bytes of a my discriminator (MD) field in accordance with the hash index, and allocating a last two bytes of the MD field to a serial number of a BFD session.

5. A device, comprising:
    a processor, configured to:
    perform a mapping operation on identification information of a local device according to a mapping algorithm to obtain a mapping result;
    combine the mapping result and a serial number of a session corresponding to a first bidirectional forwarding detection (BFD) control packet to form a first discriminator value, wherein the first discriminator value is unique in a local area network to which the device belongs; and
    generate the first BFD control packet, wherein the first BFD control packet comprises the first discriminator value; and
    a transmitter coupled to the processor, configured to send the first BFD control packet to a peer device that performs a session negotiation with the device according to the first discriminator value.

6. The device according to claim 5, comprising:
    a receiver coupled to the processor, configured to receive a second BFD control packet from the peer device, wherein the second BFD control packet carries a second discriminator value generated by the peer device,
    wherein the processor is configured to use the first discriminator value and the second discriminator value to identify a session.

7. The device according to claim 5, wherein the identification information of the device comprises one or more of a media access control (MAC) address, a device name, an interface IP, and an outbound interface index of the device.

8. A system, comprising:
a local device, configured to:
perform a mapping operation on identification information of a local device according to a mapping algorithm to obtain a mapping result;
combine the mapping result and a serial number of a session corresponding to a first bidirectional forwarding detection (BFD) control packet to form a first discriminator value, wherein the first discriminator value is unique in a local area network to which the local device belongs;
generate the first BFD control packet, wherein the first BFD control packet comprises the first discriminator value; and
send the first BFD control packet to a peer device; and
the peer device, configured to perform a session negotiation with the local device according to the first discriminator value.

9. The system according to claim 8, wherein the peer device is configured to send a second BFD control packet to the local device, the second BFD control packet carries a second discriminator value generated by the peer device, and the second discriminator value is unique in a local area network to which the peer device belongs.

10. The system according to claim 9, wherein the local device is further configured to receive the second BFD control packet and use the first discriminator value and the second discriminator value to identify a session.

11. The system according to claim 8, wherein the identification information of the local device comprises one or more of a media access control (MAC) address, a device name, an interface IP, and an outbound interface index of the local device.

* * * * *